United States Patent [19]

Yonezawa et al.

[11] 4,191,713

[45] Mar. 4, 1980

[54] ROOM TEMPERATURE CURABLE COMPOSITION

[75] Inventors: Kazuya Yonezawa; Yasushi Kato; Hisao Furkawa; Masaaki Azuma, all of Kobe, Japan

[73] Assignee: Kanegafuchi Kagaku Kogyo Kabushiki Kaisha, Osaka, Japan

[21] Appl. No.: 973,888

[22] Filed: Dec. 28, 1978

[30] Foreign Application Priority Data

Dec. 29, 1977 [JP] Japan .................................. 52/159437

[51] Int. Cl.$^2$ ...................... C08L 43/04; C08L 83/12
[52] U.S. Cl. ..................... 525/102; 525/328; 525/329; 525/342; 525/100; 528/38; 528/272; 528/297
[58] Field of Search ............... 526/15, 16, 29; 528/11, 528/30, 31, 32, 38, 41, 272, 297; 260/824 EP, 861, 824 R

[56] References Cited

U.S. PATENT DOCUMENTS

| | | | |
|---|---|---|---|
| 3,655,598 | 4/1972 | Antonen et al. | 260/18 S |
| 3,678,010 | 7/1972 | Brode | 528/38 X |
| 3,701,815 | 10/1972 | Matzner et al. | 260/824 R |
| 3,823,098 | 7/1974 | Joslyn | 528/38 X |
| 3,970,709 | 7/1976 | Owston | 528/38 X |
| 4,033,924 | 7/1977 | Mine et al. | 528/11 X |
| 4,070,343 | 1/1978 | Kishimoto et al. | 528/11 X |
| 4,141,926 | 2/1979 | Ariga et al. | 260/842 EP |

*Primary Examiner*—Lucille M. Phynes
*Attorney, Agent, or Firm*—Moonray Kojima

[57] ABSTRACT

An ambient temperature curable composition comprising a compound having a silyl group capable of being cured at ambient temperature in the presence of water and a silicon compound having a group capable of reacting with the terminal silyl group.

12 Claims, No Drawings

ROOM TEMPERATURE CURABLE COMPOSITION

BACKGROUND AND SUMMARY OF THE INVENTION

This invention relates to an ambient temperature curable composition, and more particularly to such composition comprising a compound containing a terminal silyl group capable of being cured at room temperature in the presence of water, and a silicon compound containing a group capable of reacting with the terminal silyl group.

We have already discovered a process for preparing various compounds having as terminal group a moisture-curably silyl functional group; and we have also discovered that these compounds are useful as coating materials, adhesives, sealants, etc.

As a result of further investigation of these compositions, we have discovered that when the compound is cured by adding a silicon compound capable of reacting with the silyl functional group, hardness, solvent resistance, heat resistance and boiling water resistance are unexpectedly improved, as compared to the case of curing without the use of the silicon compound. Moreover, we discovered that curing time is unexpectedly shortened, and the control of modulus and elongation are unexpectedly made possible and improved.

The present invention encompasses an ambient temperature (that is room temperature) curable composition comprising, as effective ingredients, the following components (A) and (B):

(A) one, or a mixture of two or more, of polyesters, ether ester block copolymers, vinyl polymers, diallyl phthalate series compounds and diallyl phthalate series copolymers having in one molecule at least one silyl group represented by the following general formula:

  (1)

wherein $R^1$ and $R^2$ each represents a hydrogen atom or a monovalent hydrocarbyl group selected from among an alkyl group, an aryl group and an aralkyl group having 1 to 10 carbon atoms; "X" represents a group selected from among halogen atom, alkoxy group, acyloxy group, ketoximato group, amido group, acid amido group, aminoxy group and mercapto group; and "a" represents an integer of 0, 1 or 2; and (B) one, or a mixture of two or more, of silicon compounds containing in one molecule at least one V group bound to silicon atom (wherein V represents a group selected from among a hydride group, hydroxyl group, alkoxy group, acyloxy group, ketoximato group, amido group, acid amido group, aminoxy group and mercapto group) and containing 1 to 20 silicon atoms.

DETAILED DESCRIPTION OF PREFERRED EMBODIMENTS

The compounds, to be used in the present invention, having a terminal silyl group represented by the formula (1), are preferably prepared by causing addition reaction between a silicon hydride compound of the following formula:

  (2)

and a compound containing a carbon-to-carbon double bond at the end or in the side chain and using a platinum series catalyst.

There are various compounds containing a carbon-to-carbon double bond at the end or in the side chain. However, compounds which are effective for use in coating materials, adhesives, sealants, etc, are preferably used, such as (1) polyesters, (2) ether ester block copolymers, (3) diallyl polybasic acid, with a polyhydric alcohol in the presence of a polyether containing terminal hydroxyl group, upon which allyl glycidyl ether is added thereto as part of the polyhydric alcohol component.

Ether ester block copolymers can also be obtained similarly by condensing a polyether having terminal hydroxyl groups as the polyhydric alcohol component with the polybasic acid in the presence of allyl alcohol, or by conducting alternating copolymerization of an epoxy compound partly containing allyl glycidyl ether and a carboxylic acid anhydride in the presence of a polyether containing terminal hydroxyl groups using a catalyst such as tertiary amine.

On the other hand, it is possible, upon preparation of polyethers, to condense various polybasic acids with polyhydric alcohol using as the polyhydric alcohol component, polyether having terminal carbon-to-carbon double bond obtained by subjecting allyl glycidyl ether to open ring copolymerization with various epoxy compounds.

The diallyl phthalate series compounds having carbon-to-carbon double bond include diallyl phthalate monomer and prepolymer, and commercially available ones are generally useable.

Diallyl phthalate and an acrylic or methacrylic ester copolymer containing carbon-to-carbon double bond are polymerized in the presence of a polymerization initiator such as azo compound or peroxide. The number of double bonds can be controlled by changing the amount of diallyl phthalate to be used as the copolymerizing component.

Vinyl polymer containing carbon-to-carbon double bond can be prepared by radical polymerization of vinylic monomer or monomers such as at least one of styrene, acrylic acid or esters thereof, methacrylic acid or esters thereof, maleic acid anhydride acrylic amide, vinyl acetate, etc, with a desired amount of allyl compound such as allyl acrylate or allyl methacrylate.

In the silicon hydride compounds represented by the formula (2), $R^1$ represents a monovalent hydrocarbyl group selected from an alkyl group and an aryl group. As specific examples of silicon hydride compounds, there are, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; ketoximato silanes, such as bis(dimethylketoximato)methylsilane and bis(cyclohexylketomiximato)methylsilane; and the like. In particular, halogenated silanes and alkoxysilanes are preferred.

Halogenated silicon containing compounds obtained by reacting halogenated silanes undergo hydrolysis, when exposed to air, with moisture and are rapidly cured, a ordinary or ambient temperature with generation of hydrogen chloride. When the odor of or corrosion caused by hydrogen chloride is not desired, compounds obtained by exchanging halogen functional group by other hydrolyzable group after hydrosilylation reaction are preferred. As the hydrolyzable functional groups, there are alkoxy group, acyloxy group, ketoximato group, amido group, acid amido group, aminoxy group, mercapto group, etc. There are various processes for converting the halogen functional group to these hydrolyzable groups. For example, as the process for converting to an alkoxy group, there are specifically illustrated the process of reacting the halogen functional group with (1) alcohols or phenols such as methanol, ethanol, 2-methoxyethanol and phenol; (2) alkoxides such as sodium, potassium or lithium alkoxides or phenoxides; (3) orthoformic esters such as methyl orthoformate, ethyl orthoformate, etc; (4) epoxides such as ethylene oxide, propylene oxide, allyl glycidyl ether, etc. In particular, the reaction system comprising the combination of (1) and (2), namely, alcohols or phenols and orthoformic esters, or the reaction system comprising the combination of (1) and (4), namely, alcohols or phenols and epoxy compounds, enable the reaction to be conducted with ease, thus, leading to favorable results.

Similarly, the use of a reaction system comprising a combination of carboxylic acids such as acetic acid, propionic acid, etc.; hydroxylamines, such as N,N-dimethylhydroxylamine, N,N-diethylhydroxyliamine, etc.; primary or secondary amines such as N,N-dimethylamine, N,N-diethylamine, pyrrolidine, etc.; acid amides having at least one hydrogen atom on nitrogen atom, such as acetamide, formamide, etc.; ketoximes such as acetoxime, methyl ethyl ketoxime, etc.; or mercaptans such as n-octylmercaptan, t-butylmercaptan, etc., and the orthoformic esters or epoxy compounds, enable partial conversion to acyloxy group, aminoxy group, amido group, acid amido group, ketoximato group and mercapto group, respectively, with the rest being converted to alkoxide group derived from the orthoformic ester or epoxy compound.

Besides the above-described conversion of halogen functional group to other hydrolyzable functional group, it is also possible to convert various hydrolyzable functional groups to other hydrolyzable functional groups.

The silicon-containing compounds to be used in the present invention are cured, when exposed to the atmosphere with the action of moisture. Curing rate varies depending upon the temperature of the atmosphere, relative humidity and the kind of hydrolyzable group. Therefore, it is necessary to take them into consideration, in particular the kind of hydrolyzable group. As the hydrolyzable group X, various ones have been described, with the alkoxy group being preferred. Of the alkoxy group, a methoxy group is more preferable.

As the silicon compounds to be used in this invention, those represented by the following formula are preferred:

$$SiR_m^{IV}V_n \qquad (3)$$

wherein $R^{IV}$ represents a monovalent organic group containing 1 to 12 carbon atoms connected to silicon atoms via silicon-to-carbon bond. The organic group may contain a hydroxyl group, alkoxy group, nitrile group, amino group, mercapto group, acid amido group, carboxylic acid group, epoxy group, acryloyl group, etc. Group V represents a group selected from among hydride group, hydroxyl group, alkoxy group, acyloxy group, ketoximato group, amido group, acid amido group, aminoxy group and mercapto group, with a hydroxyl group or alkoxy group being preferable; and wherein "n" represents an integer 1, 2, 3, or 4; and "m" represents an integer 0, 1, 2, or 3, with "m" plus "n" being 4.

Some specific examples are as follows: $Si(OCH_3)_4$, $Si(OC_2H_5)_4$, $CH_3Si(OCH_3)_3$, $CH_3Si(OC_2H_5)_3$, $(CH_3)_2Si(OCH_3)_2$, $(CH_3)_2Si(OC_2H_5)_2$, $CH_2=CHSi(OCH_3)_3$, $CH_2=CHSi(OCH_2CH_2OCH_3)_3$, $CH_2=CHSiCH_3(OCH_2CH_3)_2$,

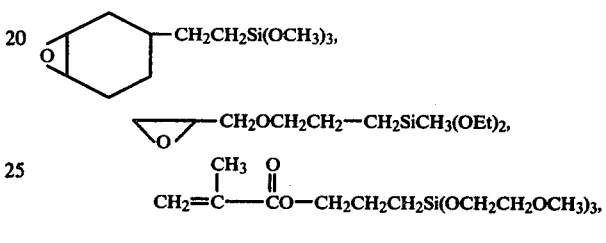

$C_2H_4NHC_3H_6SiCH_3(OCH_3)_2$, $ClC_3H_6Si(OCH_3)_3$, $HSC_3H_6Si(OEt)_3$, $Si(OCH_2CH_2CH_2CH_3)_4$,

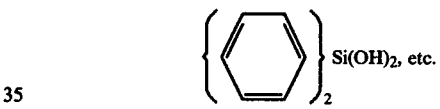

Of course, these examples are not limiting in any sense. Two or more kinds of $R^{IV}$ and V may be contained in one molecule.

Besides the silicon compounds represented by formula (3), silicon condensates of one or more kinds of $SiR_m^{IV}V_n$ having at least one group V in one molecule of the condensates are also useful. To be specific, Ethyl Silicate 40, HAS-1 (manufactured by Japan Colcoat Co.), etc, are commercially available. This is obtained by reacting the compound of formula (3) with a suitable amount of water in the presence of an alkali or acid.

Furthermore, besides the silicon compounds represented by formula (3), organopolysiloxanes having at least one group V (Group V being defined hereinbefore) bound to silicon atom and containing 2 to 20 silicon atoms can be used for adjusting such physical properties as strength and elongation of the hardened products of silyl group terminated compounds. The organopolysiloxane compounds may be linear, branched, network or cyclic compounds. As the organo group, it is preferable to use monovalent hydrocarbyl groups containing 1 to 12 carbon atoms and selected from among alkyl group, aryl group, etc. Existence of at least one group V in the organopolysiloxane is sufficient, with 1 to 6 Group V being preferable. As such group V, it is preferable to use a hydride group, hydroxyl group and alkoxy group. The organo group and group V may be contained as one kind or two or more in one molecule of organopolysiloxane. Specific examples of the organopolysiloxane compounds are set forth below. These are illustrative and are not to be considered to be limiting.

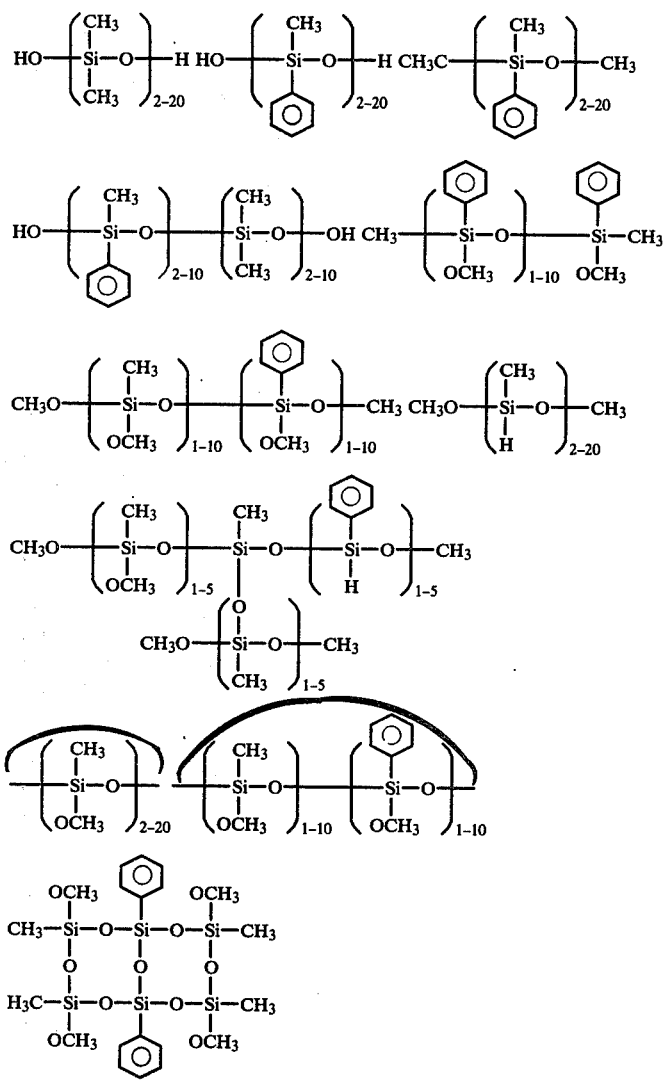

In the present invention, the silicon compounds represented by formula (1), condensates thereof or organopolysiloxane compounds are used in an amount of from 0.01 part by weight to 100 parts by weight per 100 parts by weight of the compounds having terminal silyl group or groups. The silicon compounds and organopolysiloxane compounds may be used singly or in combination of two or more.

In curing the composition of the present invention, a silanol-condensing catalyst may be, but not necessarily, used. In the case of using the condensing catalyst, known silanol condensing catalysts may be effectively used, such as, for example, organic silicon titanates; carboxylic acid metal salts (e.g. tin octylate, dibutyltin laurate, dibutyltin phthalate, etc); amine salts (e.g. dibutylamine-2-ethylhexoate, etc); and other acidic or basic catalysts. These condensation catalysts are preferably used in an amount of from 0 to 10 weight percent based on the silyl group containing compound.

The composition obtained in the present invention is useful as paints, adhesives, coating materials and sealants, etc, curable at room temperature. Various fillers may be incorporated therewith for different uses.

The invention will now be illustrated by the following actual examples, which examples are not to be considered to be limiting in any way.

EXAMPLE 1

148 g of phthalic anhydride, 46.4 g of propylene oxide, 22.8 g of allyl glycidyl ether, 11.6 g of allyl alcohol and 0.5 g of dimethylbenzylamine were charged into a 1 liter metallic autoclave, and reaction was conducted therein at 100° C. After 3 hours, 46 g of propylene oxide was added thereto, followed by reacting for one hour. Then, excess propylene oxide was removed to obtain a polyester having a molecular weight of 1,200. 9.2 g of acetic acid anhydride was added to 100 g of the thusly obtained polyester, and reacted at 120° C. for 2 hours. After removing excess acetic anhydride under reduced pressure, there was obtained a polyester wherein hydroxy groups were acetylated. 22.2 g of the thusly treated polyester, 0.0035 g of chloroplatinic acid, and 8.65 g of methyldichlorosilane were reacted at 80° C. for 3 hours, followed by removing excess methyl dichlorosilane under reduced pressure. After the reaction, 20 ml of methanol and 20 ml of methyl orthoformate were added thereto and stirred for one hour at room temperature to remove low-boiling materials under reduced pressure. Thus, there was obtained a silyl group containing polyester. 5 parts of dibutyltin maleate and 30 parts of ethyl silicate were added to 100 parts of the thusly obtained polymer. Its viscosity was measured and then coated on a mild steel plate to measure physical properties.

As comparative example 1, physical properties of the coating obtained by adding 30 parts of ethyl acetate in place of ethyl silicate, were measured. The results of both are shown below.

Table 1

| | Leaving time | Hardness | *1 | Viscosity at 25° C. (cps) | *2 |
|---|---|---|---|---|---|
| Ex. 1 | 3 days | 3H | Excellent | 1400 | 73% |
| Comp Ex 1 | 3 days | H | luster was slightly drawn | 1300 | 65% |

Note:
*1, Surface state after boiling water test for 2 hours
*2 Concentration of solids (calculated value upon being completely hardened)

As described above, addition of ethyl silicate produces unexpected improvement of hardness and boiling water resistance, and makes the coating highly solid.

EXAMPLE 2

40 g of polyethyl glycol having a molecular weight of 1000, 29.6 g of phthalic anhydryde, 9.2 g of allyl glycidyl ether and 10 g of 1,2-butylene oxide were weighed and placed in a flask equipped with a reflux condenser, and 0.2 g of dimethylbenzylamine was added thereto, followed by reacting for 4 hours at 90° C. to obtain an ether ester block copolymer having a molecular weight of about 3,000. To 50 g of this copolymer were added 10 ml of acetic anhydride and several drops of sulfuric acid, followed by stirring at 100° C. for two hours. Subsequently, low-boiling materials were removed under reduced pressure to acetylate hydroxyl groups in the copolymer. 6 ml of methyldichlorosilane and 0.00002 g of chloroplatinic acid were added thereto and reacted at 90° C. for 3 hours, followed by removing low-boiling material under reduced pressure. Then, 10 ml of methanol was added thereto, and subsequently, 5 ml of methyl orthoformate was added thereto to thereby convert halogen functional group on the silicon atom to methoxy group. Excell methanol and methyl orthoformate were removed to obtain a silyl group containing ether ester block copolymer. To 100 parts of the thusly obtained polymer were added 2 parts of dibutyltin maleate, one part of an antioxidant, 30 parts of dioctyl phthalate, 70 parts of calcium carbonate, 0.2 parts of carbon black, 3 parts of silicic anhydride and 2 parts of silicon compound having the structure

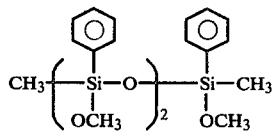

and well kneaded. The parts were by weight. This was followed by leaving the resulting product for 10 days at room temperature to obtain a hardened material. The physical properties of this material were compared with those of comparative example 2, obtained under the same conditions with the exception of omitting the addition of the silicon compound. The results are shown below.

TABLE 2

| | 150% Modulus | Strength at Break | Elongation at Break |
|---|---|---|---|
| Ex. 2 | 5 kg/cm² | 12 kg/cm² | 300% |
| Comp. Ex. 2 | 2.7 kg/cm² | 7 kg/cm² | 450% |

It can be seen from the above results that the addition of the silicon compound unexpectedly resulted in a reduced modulus at low elongation and increased elongation at break.

EXAMPLE 3

0.2 mol of methyl methacrylate, 0.086 mol of allyl methacrylate and 5 g of n-dodecylmercaptan were dissolved in 70 ml of toluene. 0.5 g of azobisisobutyronitrile was added thereto and reacted at 80° C. for 4 hours. 20 g of a toluene solution of the resulting acrylic polymer, 1.6 g of methyldichlorosilane and 0.00001 g of chloroplatinic acid were reacted for 3 hours at 90° C. with sealing of the reaction vessel. After the reaction, 5 ml of methanol and 5 ml of methyl orthoformate were added thereto, and the mixture was stirred until the pH of the solution became neutral, to obtain a silyl group containing arcylic polymer. To 100 parts of the thusly obtained polymer were added 2 parts of dibutyltin maleate and 30 parts of ethyl silicate, and coated on a mild steel plate.

The hardness of the coating was compared with that of a comparative example 3, which repeated the above but without using ethyl silicate. The results are shown below in Table 3.

TABLE 3

| | Leaving Time | Hardness |
|---|---|---|
| Example 3 | 48 hours | 3H |
| Comp. Ex. 3 | 48 hours | H |

The results of our invention were an unexpected increase in hardness.

EXAMPLE 4

100 g of diallyl phthalate prepolymer (Tradename: DAP L; manufactured by Osaka Soda Co., Ltd; iodine value; about 80), 0.00001 g of chloroplatinic acid and 1 g of hydroquinone were dissolved in 100 ml of toluene. To this solution was added 35 ml of methyldiethoxysilane, and reacted at 90° C. for 3 hours to obtain a silyl group containing diallyl phthalate prepolymer. 2 parts of dibutyltin maleate and 20 parts of HAS-1 (manufactured by Japan Colcoat Co, Ltd) were added to 100 parts of the thusly obtained prepolymer, and coated on a mild steel plate. The hardness of the coating was compared with that of comparative example 4, wherein HAS-1 was not added. The results are shown below in Table 4.

As can be seen from Table 4, there was an unexpectedly large improvement in hardness.

EXAMPLE 5

4 g of n-dodecylmercaptan and 0.5 g of azobisisobutyronitrile were added to 40 ml of a toluene solution containing 20 g of methyl methacrylate and 20 g of diallyl phthalate, and polymerization was conducted at 80° C. for 3 hours to obtain a copolymer having a molecular weight of about 1,100. To 33 g of the thusly obtained copolymer were added 7.3 g of methyldichlorosilane and 0.00001 g of chloroplatinic acid and reacted at 90° C. for 3 hours with sealing of the reactor. After the reaction, 5 ml of methanol and 5 ml of methyl orthoformate were added thereto, and stirred until the pH of the solution reached a neutral level, to obtain a silyl group containing copolymer. 2 parts of dibutyltin maleate and 30 parts of ethyl silicate were added to 100 parts of the polymer, and coated on a mild steel plate. The hardness of the coating was compared with that of a comparative example 5, wherein ethyl silicate was not added. The results are shown in Table 5. As can be seen from Table 5, the invention produced unexpectedly large increase in hardness.

TABLE 4

|  | Leaving Time | Hardness |
| --- | --- | --- |
| Example 4 | 48 Hours | 3H-4H |
| Comparative Ex. 4 | 48 Hours | H-2H |

TABLE 5

|  | Leaving Time | Hardness |
| --- | --- | --- |
| Ex. 5 | 72 Hours | 4H |
| Comp. Ex. 5 | 72 Hours | H |

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A room temperature-curable composition, comprising, as effective ingredients, the following components (A) and (B)

(A) one, or a mixture of two or more, of polyesters, ether ester block copolymers, vinyl polymers, diallyl phthalate series compounds and diallyl phthalate series copolymer having in one molecule at least one silyl group represented by the following general formula:

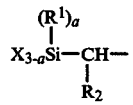

wherein $R^1$ and $R^2$ each represents a hydrogen atom or a monovalent hydrocarbyl group selected from the group consisting of alkyl group, aryl group and aralkyl group having 1 to 10 carbon atoms; "X" represents a group selected from the group consisting of halogen atom, alkoxy group, acyloxy group, ketoximato group, amido group, acid amido group, aminoxy group and mercapto group, and "a" represents an integer 0, 1, or 2; and (B) one, or a mixture of two or more, of silicon compounds containing in one molecule, at least one "V" group bound to the silicon, and containing 1-20 silicon atoms, and wherein "V" represents a group selected from the group consisting of hydride group, hydroxyl group, alkoxy group, acyloxy group, ketoximato group, amido group, acid amido group, aminoxy group and mercapto group.

2. The composition of claim 1, wherein said silyl group-containing compound is a polyester having a molecular weight of from 300 to 8,000.

3. The composition of claim 1, wherein said silyl group-containing compound is an ether ester block copolymer having a molecular weight of between 300 to 20,000.

4. The composition of claim 1, wherein said silyl group containing compound is a vinyl polymer having a molecular weight of from 300 to 20,000.

5. The composition of claim 1, wherein said silyl group containing compound is diallyl phthalate monomer or a diallyl phthalate prepolymer having a molecular weight of not more than 20,000.

6. The composition of claim 1, wherein said silyl group containing compound is a diallyl phthalate/acrylic or methacrylic ester copolymer having a molecular weight of between 300 and 20,000.

7. The composition of claim 3, wherein said ether ester copolymer has a molecular weight of the ether moiety of between 100 and 500.

8. The composition of claim 4, wherein said vinyl polymer contains acrylic ester or methacrylic ester.

9. The composition of claim 6, wherein said dially phthalate acrylic or methacrylic ester copolymer contains between 5 to 100 mol percent of diallyl phthalate.

10. The composition of claim 1, wherein said silicon compound is represented by the following general formula:

wherein $R^{IV}$ represents a monovalent organic group having 1 to 12 carbon atoms, "V" represents a group selected from the group consisting of hydride group, hydroxyl group, alkoxy group, acyloxy group, ketoximato group, amido group, acid amido group, aminoxy group and mercapto group, "m" represents an integer of 0,1,2 or 3, and "n" represents an integer of 1,2,3, or 4, with "m" plus "n" being 4.

11. The composition of claim 1, wherein said silicon compound is a condensate of one or more of $SiR_m^{IV}V_n$, said condensate contains at least one "V" group in each molecule.

12. The composition of claim 1, wherein said silicon compound is an organopolysiloxane containing between 2 to 20 silicon atoms in each molecule.

* * * * *